W. N. FORBES.
TIRE TREAD.
APPLICATION FILED JUNE 27, 1918.
1,349,055.  Patented Aug. 10, 1920.
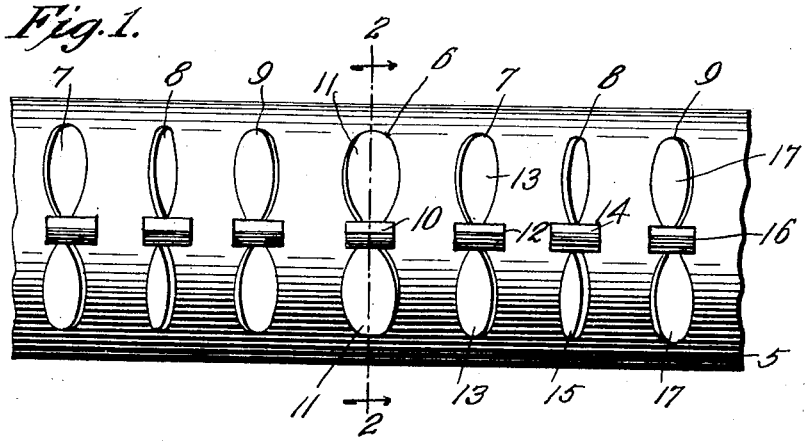
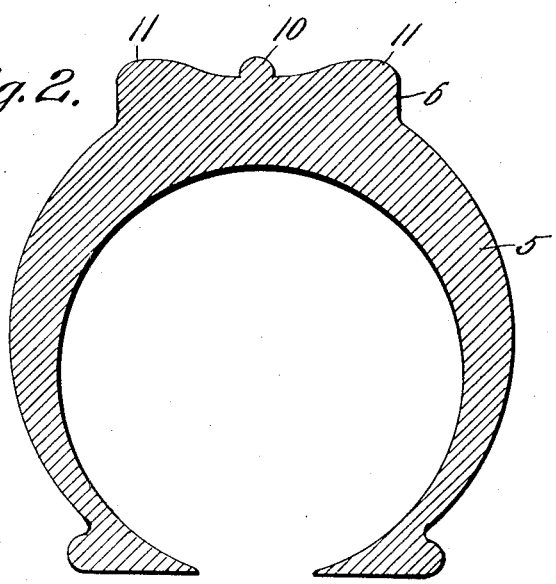
Witnesses
James F. Crown
H. B. Vrooman
Inventor
Wesley N. Forbes,
By Richard B. Owen,
Attorney

UNITED STATES PATENT OFFICE.

WESLEY N. FORBES, OF DARTMOUTH, NOVA SCOTIA, CANADA.

TIRE-TREAD.

1,349,055.  Specification of Letters Patent.  Patented Aug. 10, 1920.

Application filed June 27, 1918. Serial No. 242,281.

*To all whom it may concern:*

Be it known that I, WESLEY N. FORBES, a subject of the King of England, residing at Dartmouth, in the Province of Nova Scotia and Dominion of Canada, have invented certain new and useful Improvements in Tire-Treads, of which the following is a specification.

This invention is a tire tread and has for its principal object the production of a raised construction upon the tread of the tire which will prevent the same from skidding and slipping and will tend to increase the gripping action of the tire.

Another object of this invention is the production of a tire tread wherein a plurality of raised elements are formed upon the tread, these elements having various pitches, thus causing the elements to assist in the gripping action of the tire.

One practical form of construction and assembly of the present invention will be hereinafter described and is illustrated in the accompanying drawing, in which—

Figure 1 is a plan view of a portion of the tire showing the tread construction thereof, and Fig. 2 is a section taken on the line 2—2 of Fig. 1.

In the preferred embodiment of the present invention, about to be described, it will be seen that the casing 5 is of the usual construction and may be of any approved form or type, inasmuch as the invention resides in the construction of the tread. The tread consists of a series of elements formed thereon, each series consisting of several elements formed at different pitches, indicated at 6, 7, 8 and 9. As many of these series as desired may be formed upon the tire tread.

The element 6 is formed integral upon the casing 5, as are the other elements and this element 6 comprises an elongated semi-cylindrical rib 10 extending circumferentially of the casing 5 and having substantially elliptical flat webs 11 extending in opposite directions. By referring to Fig. 1 it will be seen that the outer surfaces of the webs 11 are inclined to extend at an oblique angle to the surface of the casing 5 and these webs are thickened adjacent their ends to cause the webs to engage a road bed throughout their entire lengths.

The element 7 comprises an elongated cylindrical rib 12 having webs 13 extending in opposite directions therefrom. It will be noted however, that the outer surfaces of the webs 13 are formed at a greater pitch with respect to the surface of the casing than are the webs of the element 6, thus causing the element 7 to be as though it were partly turned, although it will be understood that it is formed upon the tread of the casing 5 and for this reason provides a very firm support.

The element 8 also consists of a rib 14 from which extend the oppositely projecting webs 15. It will be noted that the surfaces of the webs 15 are formed at a greater pitch with respect to the surfaces of the casing than are the webs 13 of the element 7. Therefore the surfaces of the webs 15 have the greatest pitch of any of the webs.

It will be noted that the webs of each element are substantially elliptical and for this reason the webs are somewhat similarly constructed, although some of the webs are more narrow than others owing to the fact that the manner in which the outer surfaces are inclined or pitched with respect to the surface of the tire casing tends to narrow the construction of the webs somewhat. The webs however, are increased in thickness toward their ends as indicated in Fig. 2 whereby although the structures are formed on the casing, of a pneumatic tire, they will engage the road bed throughout their entire length which they would not do if they were of uniform thickness throughout their entire length for under such conditions they would be curved in the general arc of a circle and the ends thereof would not engage the road bed. As the ribs extend circumferentially of the tire and are substantially semi-cylindrical the ends thereof will tend to keep the casing from slipping and the bodies of the ribs will tend to hold the same from side movement. As the webs are substantially elliptical, it is obvious the edges thereof will tend to dig into a supporting surface being provided for meeting various conditions. Where the surfaces are pitched to present a comparatively broad surface as for instance the elements 6, 7 or 9, when a pavement is damp and slippery, these broad surfaces will tend to adhere thereto to hold the tire from slipping. However, if snow or like covering is on the pavement or the casing is passing over a muddy surface the pitch of the webs of the element 8 would tend to allow the element to dig more deeply in such road bed to keep the wheel from slipping or skidding. Thus as above pointed out, the pitch of the webs will meet different requirements of road beds over which the casing is traveling.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

A tire including a casing having raised elements on its tread, said elements extending transversely of the casing, said elements consisting of elongated semi-cylindrical ribs extending circumferentially of the casing and being spaced apart, webs extending from the sides of said ribs, said webs being substantially elliptical and having increased thickness at their ends, whereby the elements will engage the road bed throughout their entire length, while the elliptical construction of the webs provides maximum engaging surfaces around the edges of the webs to hold the tire casing from slipping or skidding.

In testimony whereof I affix my signature in presence of two witnesses.

WESLEY N. FORBES.

Witnesses:
  COLIN MCNAB,
  J. ERIC FORBES.